United States Patent
Reial et al.

(10) Patent No.: US 11,968,547 B2
(45) Date of Patent: *Apr. 23, 2024

(54) METHOD AND APPARATUS FOR BEAMFORMING CONTROL IN A WIRELESS COMMUNICATION NETWORK

(71) Applicant: Telefonaktiebolaget LM Ericsson (publ), Stockholm (SE)

(72) Inventors: Andres Reial, Malmo (SE); Icaro L. J. Da Silva, Solna (SE); Johan Rune, Lidingo (SE); Henrik Sahlin, Molnlycke (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/720,413

(22) Filed: Apr. 14, 2022

(65) Prior Publication Data
US 2022/0386141 A1 Dec. 1, 2022

Related U.S. Application Data

(63) Continuation of application No. 16/342,658, filed as application No. PCT/EP2018/084361 on Dec. 11, 2018, now Pat. No. 11,310,674.

(51) Int. Cl.
*H04W 16/28* (2009.01)
*H04W 8/24* (2009.01)
(Continued)

(52) U.S. Cl.
CPC .............. *H04W 16/28* (2013.01); *H04W 8/24* (2013.01); *H04W 48/02* (2013.01); *H04W 48/20* (2013.01);
(Continued)

(58) Field of Classification Search
CPC .......... H04W 74/0833; H04W 56/001; H04W 48/20; H04W 8/24; H04W 16/28;
(Continued)

(56) References Cited

U.S. PATENT DOCUMENTS 9,681,309 B2 * 6/2017 Raghavan .............. H04B 7/088
11,310,674 B2 * 4/2022 Reial ................... H04W 56/001
(Continued)

FOREIGN PATENT DOCUMENTS

WO 2013086164 A1 6/2013
WO 2018085601 A1 5/2018

OTHER PUBLICATIONS

PCT International Search Report, dated Aug. 13, 2019, in connection with International Application No. PCT/EP2018/084362, all pages.
(Continued)

*Primary Examiner* — Congvan Tran
(74) *Attorney, Agent, or Firm* — Leffler Intellectual Property Law, PLLC

(57) ABSTRACT

A base station or other network node configures a network transmission in dependence on a directional scanning reception ability of a wireless communication device targeted by the transmission. An example transmission configuration is selecting or restricting which Transmission/Reception Point to use for the transmission or selecting or restricting the beamforming configuration to use for the transmission. The device complements operations in the wireless communication network by indicating its directional scanning reception ability in initial signaling, such as used for random access, or in Radio Resource Control signaling, or both.

30 Claims, 5 Drawing Sheets

(51) Int. Cl.
  *H04W 48/02* (2009.01)
  *H04W 48/20* (2009.01)
  *H04W 56/00* (2009.01)
  *H04W 74/0833* (2024.01)

(52) U.S. Cl.
  CPC ..... *H04W 56/001* (2013.01); *H04W 74/0833* (2013.01)

(58) Field of Classification Search
  CPC ..... H04W 48/02; H04B 7/088; H04B 7/0695; H04B 7/0617
  See application file for complete search history.

(56) References Cited

U.S. PATENT DOCUMENTS

| | | |
|---|---|---|
| 2015/0382268 A1 | 12/2015 | Hampel et al. |
| 2016/0044517 A1 | 2/2016 | Raghavan et al. |
| 2017/0373740 A1 | 12/2017 | Guo et al. |
| 2018/0070343 A1 | 3/2018 | Chen et al. |
| 2018/0212651 A1 | 7/2018 | Li et al. |
| 2018/0227094 A1 | 8/2018 | Liu et al. |
| 2018/0288756 A1 | 10/2018 | Xia et al. |
| 2018/0332659 A1 | 11/2018 | Hwang et al. |
| 2019/0141693 A1 | 5/2019 | Guo et al. |
| 2019/0165831 A1 | 5/2019 | Zhou et al. |
| 2019/0320337 A1 | 10/2019 | Siomina et al. |
| 2020/0037360 A1* | 1/2020 | Qian ............ H04B 7/0695 |
| 2020/0092737 A1 | 3/2020 | Siomina et al. |
| 2020/0228268 A1 | 7/2020 | Cao |
| 2020/0322915 A1 | 10/2020 | Zhang et al. |
| 2021/0028850 A1 | 1/2021 | Elliott et al. |
| 2021/0112541 A1 | 4/2021 | Manolakos et al. |
| 2021/0360430 A1 | 11/2021 | Reial et al. |

OTHER PUBLICATIONS

PCT Written Opinion, dated Aug. 13, 2019, in connection with International Application No. PCT/EP2018/084362, all pages.
PCT International Search Report, dated Aug. 12, 2019, in connection with International Application No. PCT/EP2018/084361, all pages.
PCT Written Opinion, dated Aug. 12, 2019, in connection with International Application No. PCT/EP2018/084361, all pages.
Non-Final Office Action dated Aug. 31, 2021 in connection with U.S. Appl. No. 16/342,609, 34 pages.
Final Office Action dated Jan. 7, 2022 in connection with U.S. Appl. No. 16/342,609, 40 pages.
European Communication dated May 11, 2023 in connection with European Application No. 18822309.3, 4 pages.

* cited by examiner

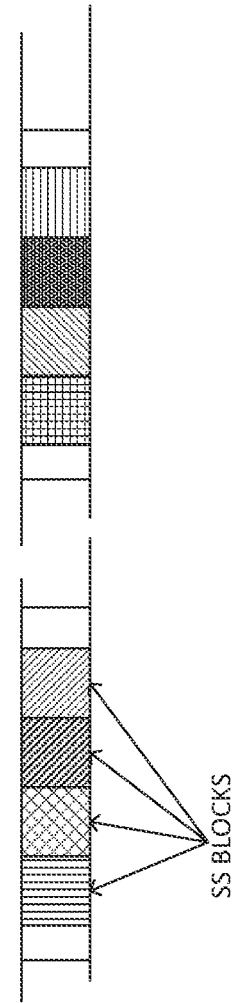
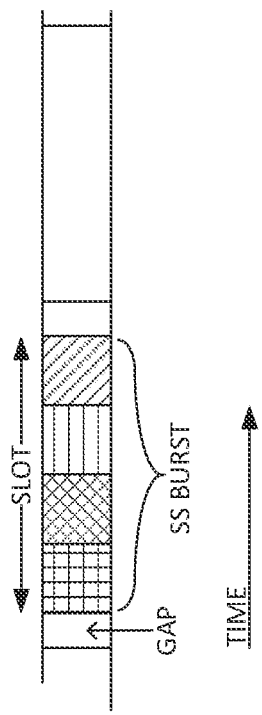
FIG. 12
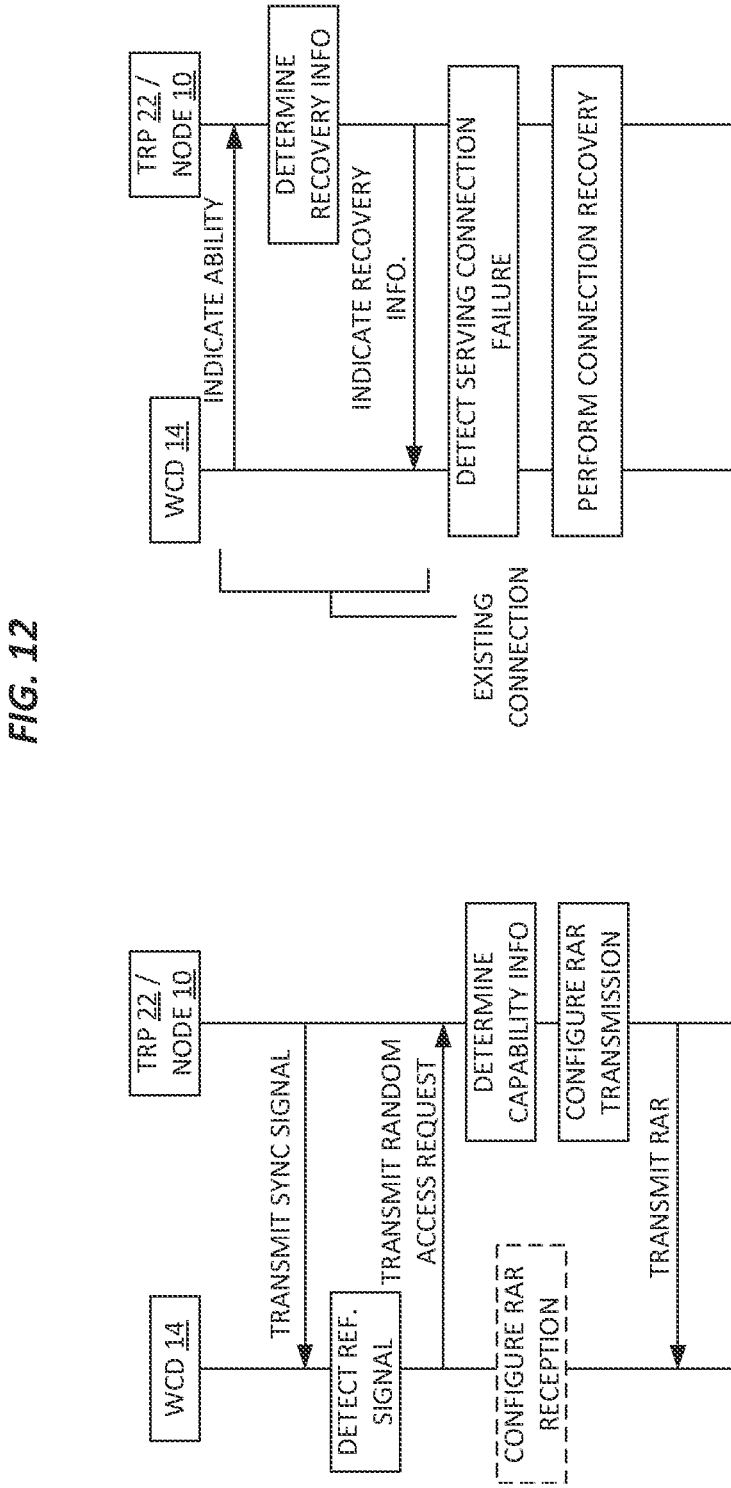
FIG. 13
FIG. 14

METHOD AND APPARATUS FOR BEAMFORMING CONTROL IN A WIRELESS COMMUNICATION NETWORK

CROSS-REFERENCE TO RELATED APPLICATIONS

This application claims the benefit of U.S. application Ser. No. 16/342,658, filed Apr. 17, 2019 (371(c) date), which is a 371 National Stage Application of PCT/EP2018/084361, filed Dec. 11, 2018. Both of these earlier applications are hereby incorporated herein by reference in their entireties.

TECHNICAL FIELD

The present invention relates to wireless communication networks and, in particular, to transmission and reception beamforming in a wireless communication network.

BACKGROUND

"Beamforming" refers to the use of directional signal transmission or reception, as compared to omnidirectional signal transmission or reception. Beamforming has increasing importance in the development of wireless communication networks. An example case involves the New Radio (NR) or so-called "5G" network technology under development by the Third Generation Partnership Project (3GPP). Beamforming by Transmission/Reception Points (TRPs) in 5G networks and by the wireless communication devices supported by such networks plays a pivotal role in extending the reach of communication signals at higher frequencies.

A mobile phone or another type of wireless communication device improves its signal reception by "scanning" in different angular directions, using reception beamforming. When searching for critical network signals, such as downlink synchronization signals or other reference signals, the device may perform a reception beam sweep, wherein the device scans for signals of interest in each of multiple directions.

Examples of key downlink signals include a primary synchronization signal (PSS) that allows for network detection in the presence of a high initial frequency error at the device, up to tens of ppm. Additionally, the PSS provides a network timing reference. In NR, a radio network node transmits one of three m-sequences as its PSS, allowing a device to search for a received PSS by correlating received signal energy against each the known m-sequences. However, the device may perform multiple correlations involving different frequency-error hypotheses, to accommodate potentially large frequency offsets between its local oscillator (LO) and the frequency of the radio network node.

A Secondary Synchronization Signal (SSS) paired with the PSS provides for more accurate frequency adjustments and channel estimation at the device, while at the same time providing fundamental network information, such as cell identification. Detection of an SSS may be correlation-based, similar to the detection of a PSS, and SSSs also may be based on m-sequences. A PSS/SSS pair may be referred to as a Synchronization Signal (SS)

Another key downlink signal is the Physical Broadcast Channel (PBCH), which provides a subset of the minimum system information needed by the device for attempting random access to the network. The term Master Information Block or MIB denotes the minimum system information carried in the PBCH, and the PBCH further includes Demodulation Reference Signals (DMRS), enabling channel estimation at the device, for proper reception of the information carried in the PBCH.

SUMMARY

A base station or other network node configures a network transmission in dependence on a directional scanning reception ability of a wireless communication device targeted by the transmission. An example transmission configuration is selecting or restricting which Transmission/Reception Point (TRP) to use for the transmission or selecting or restricting the beamforming configuration to use for the transmission. The wireless device complements operations in the network by indicating its directional scanning reception ability in initial signaling, such as used for random access, or in Radio Resource Control (RRC) signaling, or both. In an example point of differentiation, the network node configures the network transmission in dependence upon whether the device has the ability to receive in multiple directions simultaneously.

An example method of operation by a network node in a wireless communication network includes determining a directional reception scanning ability of a wireless communication device, according to a capability indication signaled by the device. The example method further includes the network node configuring a network transmission for the device, in dependence on the directional reception scanning ability of the device. In one embodiment, the network node operates a TRP and performs the network transmission, while in another embodiment, the network node controls or communicates with the radio node that performs the network transmission, for configuration of the transmission according to the indicated ability of the device.

An example method of operation by a wireless communication device configured for operation with a wireless communication network includes determining a directional reception scanning ability of the device, and sending a capability indication to the network, indicating the directional reception scanning ability of the device. In an example embodiment of the method, the device indicates whether it has the ability to scan in multiple reception directions simultaneously. Flexibility exists regarding when and how the device indicates its directional reception scanning ability, including sending the indication via random-access signaling and/or via Radio Resource Control (RRC) signaling, and sending it by default, on demand, or responsive to the fulfillment of a triggering condition.

In a corresponding example implementation, a wireless communication device configured for operation with a wireless communication network includes communication circuitry and processing circuitry. The communication circuitry is configured for wireless communication with TRPs in the network, and the processing circuitry is operatively associated with the communication circuitry, e.g., to send and/or receive control signaling or other information via the communication circuitry. The processing circuitry is configured to determine a directional reception scanning ability of the device, and send a capability indication to the network, indicating the directional reception scanning ability of the device.

Another embodiment of a wireless communication device includes functional units or processing modules, according to which the device operates as described herein. The device includes, for example, a determining module configured to determine the directional reception scanning ability of the device, and a sending module configured to send a capability indication to the network, indicating the directional reception scanning ability of the device.

In a complementary example of a network node, the network node comprises communication circuitry configured for wireless communication with wireless communication devices or configured for inter-nodal communication with another network node in the network that is configured for wireless communication with wireless communication devices. The example network node further includes processing circuitry operatively associated with the communication circuitry and configured to determine a directional reception scanning ability of a wireless communication device, according to a capability indication signaled by the device, and configure a network transmission for the device, in dependence on the directional reception scanning ability of the device.

Another embodiment of a network node includes functional units or processing modules, according to which the network node operates as described herein. The network node includes, for example, a determining module configured to determine the directional reception scanning ability of a wireless communication device, according to a capability indication signaled by the device. The example network node further includes a configuring module that is configured to configure a network transmission for the device, in dependence on the directional reception scanning ability of the device.

In yet another embodiment, a system comprises a wireless communication device and a network node. The device comprises communication circuitry configured for wireless communication with TRPs in the network, and further comprises processing circuitry that is operatively associated with the communication circuitry. The processing circuitry is configured to determine a directional reception scanning ability of the device, and send an indication of its directional reception scanning ability to the network node, e.g., via a TRP. The network node comprises communication circuitry configured for wireless communication with wireless communication devices or configured for inter-nodal communication with another network node in the network that is configured for wireless communication with wireless communication devices. Further included in the network node is processing circuitry operatively associated with the communication circuitry and configured to determine a directional reception scanning ability of a wireless communication device, according to a capability indication signaled by the device, and configure a network transmission for the device, in dependence on the directional reception scanning ability of the device.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 12 is a diagram of example SSB burst transmissions.

FIG. 13 is a signal flow diagram of an example embodiment of system operation involving a WCD and a network node, in the context of random access by the WCD.

FIG. 14 is a signal flow diagram of an example embodiment of system operation involving a WCD and a network node, in the context of connection failure recovery.

DETAILED DESCRIPTION

As a non-limiting advantage of network and device embodiments detailed herein, a network transmission performed with respect to a wireless communication device (WCD) depends on a directional reception scanning ability learned for the WCD. Tailoring the network transmission in dependence on the directional reception scanning ability of the WCD allows the network to increase the likelihood of successful reception at the WCD, or otherwise perform the transmission in a way that does not consume more transmission resources than necessary.

As a non-limiting example, the WCD indicates its directional reception scanning ability in a random access request and the network node tailors transmission of the random access response (RAR), in view of the directional reception scanning ability of the WCD. For example, the network node chooses or restricts which Transmission/Reception Point(s) (TRPs) are used for transmitting the RAR or chooses or restricts which transmission beamforming directions are used for transmitting the RAR. More generally, the network node may choose the transmission beamforming configuration used for transmitting the RAR or other signaling, in dependence on the directional reception scanning ability indicated by the WCD, which indicates, for example, whether the WCD has the ability to receive in multiple directions simultaneously, i.e., the ability to optimize or tune reception towards multiple receive directions during a single transmission interval of a transmitted signal.

In one embodiment, directional reception entails collecting a single set of samples describing the transmitted signal from multiple antenna elements and emulating receiver beamforming with different spatial properties by applying different combining weights to the per-element samples in baseband processing. In another embodiment, directional reception entails operating multiple antenna panels or antenna element subsets in parallel, where each panel or subset performs real-time analog combining according to different spatial reception properties.

In contrast, the lack of such ability means that the WCD can only perform receiver beamforming in a single preferential direction, or according to a single spatial combining configuration, at a time. If the WCD has that ability, the network node may use an omnidirectional transmission, or may transmit in multiple directions simultaneously, or may transmit in each transmission beam direction once, rather than on a repeated basis, or may use a shorter beam dwell time.

Figures 1, 2:
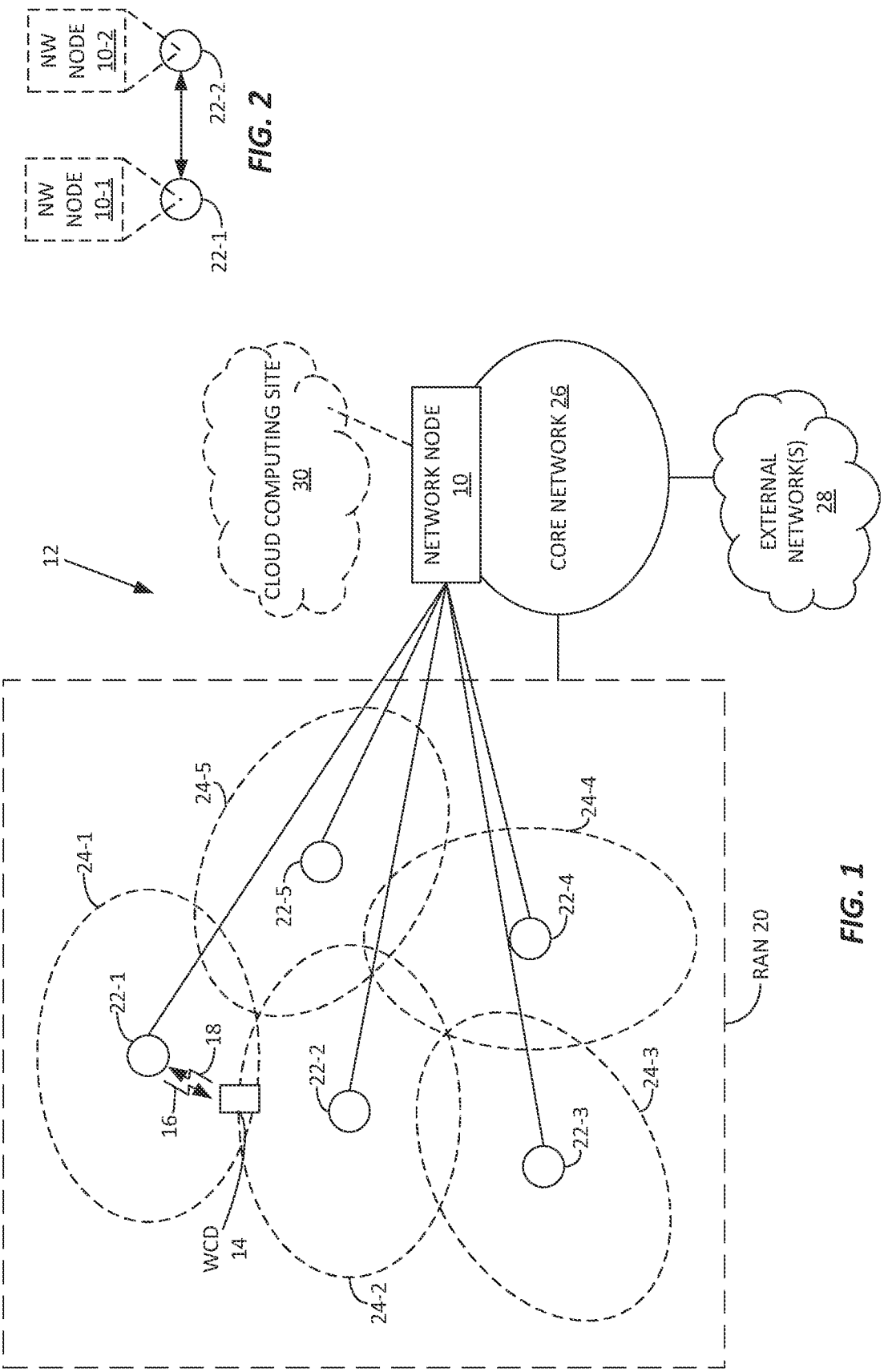
FIG. 1 is a block diagram of an example embodiment of a wireless communication network that includes a network node operative to configure a network transmission from a Transmission/Reception Point (TRP) according to a directional reception scanning ability indicated by a wireless device.
FIG. 2 is a block diagram of another network embodiment, including respective network nodes implemented at respective TRPs, each network node operative to configure network transmissions at its respective TRP.

FIG. 1 illustrates an example network node 10 that is configured for operation in a wireless communication network 12. The network 12 provides one or more types of communications services to WCDs 14, with only one WCD 14 shown for simplicity of illustration. Communication between the WCD 14 and the network 12 involves one or more network transmissions 16, i.e., downlink signals, transmitted by the network 12 and uplink signals 18 transmitted by the WCD 14. The network 12 includes a radio access network (RAN) 20 that includes one or more Transmission/Reception Points (TRPs) 22, with each TRP 22 providing radio service over one or more coverage areas 24.

In an example case, the coverage areas 24 are respective "cells" of the network 12, with each cell representing the allocation or use of particular communication resources over a particular geographic area, such as the allocation of a carrier frequency. General examples of communication resources include time resources, frequency resources, or code resources, or any combination of time, frequency and code resources. In other examples, the coverage areas 24 represent transmission beams used by the respective TRPs 22, with the possibility that at least some of the coverage areas 24 are dynamic, such as where beam directions are steered or where different beams are activated at different times. Further, while the illustration may suggest the use of broad beams, a TRP 22 may use various sizes or shapes of beams.

FIG. 1 depicts five TRPs 22, denoted as 22-1, 22-2, 22-3, 22-4, and 22-5. Five coverage areas 22 correspond to the respective TRPs 22 and are denoted as 24-1, 24-2, 24-3, 24-4, and 24-5. The foregoing values are only examples. The RAN 20 may have more TRPs 22 or fewer TRPs 22, and each TRP 22 may provide more than one coverage area 24. The RAN 20 operates as a Third Generation Partnership Project (3GPP) network, for example. In at least one embodiment, the RAN 20 operates as a New Radio (NR) or 5G access network in which each TRP 22 includes an antenna array operative for transmission beamforming.

A core network (CN) 26 provides an interface to one or more external networks 28, such as the Internet. The CN 26 and/or the RAN 20 also may connect with one or more cloud computing sites 30 that provide centralized processing or data resources used in one or more aspects of network operation. For example, all or part of the functionality attributed to the network node 10 described herein may be implemented at a cloud computing site 30.

In the context of FIG. 1, the WCD 14 is configured for operation in the network 12, i.e., it is configured to connect with and communicate with TRPs 22 in the network 12 according to the air interface and protocols implemented by the network 12. In one aspect of its communications with the network 12, the WCD 14 indicates a directional reception scanning ability, relating to how the WCD 14 performs directional reception. Correspondingly, the network node 10 is operative to configure a network transmission at one or more TRPs 22 with respect to the WCD 14, based on the indicated directional reception scanning ability.

A "directional reception scanning ability" of a WCD 14 comprises, for example, the ability to receive in multiple directions simultaneously, which may be based on antenna beamforming or post-processing of antenna-received signals. Thus, the WCD 14 in an example embodiment is configured to indicate whether it has the ability to receive in multiple directions simultaneously. For example, the WCD 14 may indicate at least one of whether it has an ability to scan multiple reception directions based on a single reception or reception instance or indicate whether it has an ability to scan multiple reception directions using postprocessing of a single reception or reception instance. The network (NW) can utilize the ability information to adapt its signal transmission, e.g., between transmitting a signal to a WCD from an arbitrary direction, if the WCD has indicated the simultaneous reception ability, or alternatively transmitting a signal from a predetermined direction during a single reception instance for the WCD or transmitting a signal from one of multiple possible directions during multiple reception instances.

A centralized position characterizes the network node 10 of FIG. 1, wherein the network node 10 has responsibility for multiple TRPs 22. Although the diagram depicts lines of communication directly between the network node 10 and the respective TRPs 22, the network node 10 may communicate with the respective TRPs 22 using signaling paths associated with other logical connections, such as between the RAN 20 and mobility, access, or authentication entities in the core network 26, which are not shown here for simplicity. Along these lines, in an example implementation where the network node 10 resides in the CN 26, the network node 10 communicates with respective TRPs 22 in the RAN 20 using SI Application Protocol (AP) signaling.

FIG. 2 illustrates another embodiment where a respective network node 10 is implemented in each of the TRPs 22, e.g., the TRP 22-1 includes a network node 10-1, and the TRP 22-2 includes a network node 10-2, and so on. One view of the arrangement of FIG. 2 is that the respective network nodes 10 are co-located with the respective TRPs 22. In another understanding, each TRP 22 implements the functionality of the network node 10, e.g., using the processing and communication circuitry included in the TRP 22. Consequently, unless stipulated or clear from the context, the term "network node 10" may connote a standalone node within the network 12 or may connote functionality integrated into another node, such as a TRP 22.

Moreover, the term TRP 22 broadly covers, unless stipulated or clear from the context, a broad range of node types. For example, the TRPs 22 may be radio base stations, referred to as eNBs according to the terminology used for networks based on Long Term Evolution (LTE) specifications, or referred to as gNBs in the NR context. Further possibilities include the implementation of TRPs 22 as points in a distributed antenna system (DAS), or as remote radio units (RRUs) associated with one or more controlling digital radio units (DRUs), 5G specifications contemplate a split in the radio processing chain, in which a gNB—a 5G base station-includes a Central Unit (CU) and one or more Distributed Units (DUs). In such a scenario, the functionality of the contemplated network node 10 may be implemented in the DU portion of a gNB, and provide beam sweep configuration control for each of the CUs controlled by the DU.

Figure 3:
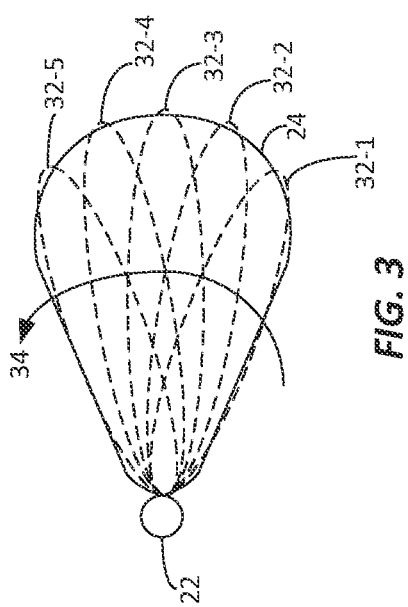
FIG. 3 is a diagram of an example transmission beamforming configuration at TRP, wherein the TRP performs a transmission beam sweep.

FIG. 3 illustrates an example "beam sweep" 34 as performed by a TRP 22, for transmission beamforming. A TRP 22 uses transmission beam sweeping, for example, to transmit certain reference signals, such as downlink synchronization signals, Cell Reference Signals (CRS), mobility reference signals, which may be beam-specific, or the like.

The TRP 22 uses a number of directional beams 32 to span a certain angular range, which by default or for the transmission of network discovery signals may be the angular range corresponding to the coverage area 24. The term "beam sweep" denotes the fact the angular range may be divided into multiple directional beams. How long the beam sweep takes, and the resources needed for it depends on the number of beams and the duration or dwell time of each beam. Here, the term "resource" denotes time resources, or frequency resources, or code/ID resources (e.g., beam identifiers or beam-specific sequences), or any combination thereof.

Figure 4:
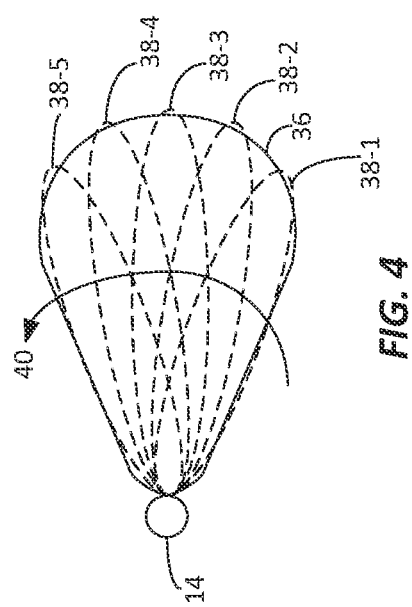
FIG. 4 is a diagram of an example reception beamforming configuration at a wireless communication device (WCD), wherein the WCD performs a reception beam sweep.

FIG. 4 illustrates an example reception beam sweep 40 at the WCD 14, where the WCD 14 uses reception beam sweeping to make mobility measurements, for example—e.g., perform cell or beam searching—to identify candidate cells or beams for communicating with the network 12. More broadly, the WCD 14 may use reception beam sweeping to search for any one or more types of downlink reference signals or other downlink transmissions. The timewise length of a reception beam sweep—the sweep length—depends on the number of beams 38 used to span the angular range 36 and on whether the WCD 14 has the ability to receive in multiple directions simultaneously. Other terms for "reception beam sweep" are "reception beam scan" or, more simply, "team scan".

Figure 5:
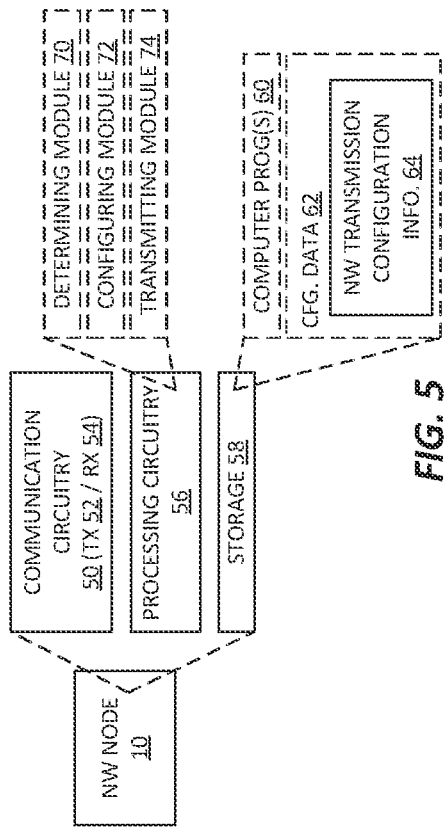
FIG. 5 is a block diagram of an example embodiment of the network node depicted in FIG. 1 or 2.

FIG. 5 depicts example details for the network node 10, with the network node 10 comprising communication circuitry 50. The communication circuitry 50 includes, for example, the physical-layer interface circuitry, which may be configured for wired and/or wireless communication, including corresponding transmitter circuitry 52 and receiver circuitry 54. In implementations where the network node 10 comprises a functional implementation within a TRP 22, the communication circuitry 50 may comprise the radiofrequency communication circuitry used by the TRP 22 for transmitting to and/or receiving from WCDs 14. In implementations where the network node 10 is separate from a TRP 22, the communication circuitry 50 may comprise wired or wireless interface circuitry configured for communicating directly or indirectly with one or more TRPs 22, which in turn communicate with respective WCDs 14.

Further example components of the network node 10 include processing circuitry 56 that is operatively associated with the communication circuitry 50—i.e., control or data signaling into and out of the processing circuitry 56 may flow through the communication circuitry 50. Example implementations of the processing circuitry 56 include the use of dedicated or fixed circuits or the use of programmatically configured circuits or the combined use of fixed and programmed circuitry. As such, the processing circuitry 56 may comprise one or more microprocessors, digital signal processors (DSPs), field programmable gate arrays (FPGAs), application specific integrated circuits (ASICs), or other arrangements of digital processing circuitry that are realized according to the execution of stored computer program instructions in the form of stored software or firmware.

Correspondingly, an example implementation of the network node 10 includes storage 58 that comprises one or more types of computer-readable storage media. The storage 58 provides, for example, volatile memory for use in the live operation of the network node 10 and non-volatile memory for longer-term storage of one or more computer programs 60 and one or more items of configuration data 62, such as network (NW) transmission configuration information 64 that defines or relates to the configuration of a network transmission to be performed by one or more TRPs 22. In instances where the processing circuitry 56 is based on general-purpose CPUs or other general-purpose circuitry, such general-purpose circuitry is specially adapted to carry out the operations detailed herein, based on the execution of computer program instructions included in the one or more stored computer programs 60.

With the above in mind, the communication circuitry 50 is configured for wireless communication with WCDs 14 or configured for inter-nodal communication with another network node 10, 22 in the network 12 that is configured for wireless communication with WCDs 14. The processing circuitry 56 is operatively associated with the communication circuitry 50 and configured to: determine a directional reception scanning ability of a WCD 14, according to a capability indication signaled by the WCD 14, and configure a network transmission for the WCD 14, in dependence on the directional reception scanning ability of the WCD 14.

Configuring the network transmission for the WCD 14 means configuring the transmission for the WCD 14, either as an individual WCD 14 or as one WCD 14 among two or more WCDs 14. One example involves the WCD 14 as the sole intended recipient of the network transmission, with the network transmission being configured according to the directional reception scanning ability of the WCD 14. Another example involves the WCD 14 as one among two or more WCDs 14 as intended recipients. Here, configuring the network transmission in dependence on the directional reception scanning ability of the WCD 14 comprises, for example, considering its ability in relation to the directional reception scanning ability/abilities of the other WCDs 14 targeted by the network transmission.

One approach to jointly considering the directional reception scanning abilities of two or more WCDs 14 results in the network node 10 configuring the network transmission in view of a least-capable one of the WCDs 14. In any case, configuring the network transmission "for" a WCD 14 may mean configuring it for a single WCD 14, in view of the directional reception scanning ability of the WCD 14, or configuring the network transmission for reception by more than one WCD 14, based on considering their respective or relative directional reception scanning abilities.

In one or more embodiments, the TRP 22 that receives the indication of the directional reception scanning ability of a WCD 14—the "indication"—is not necessarily the TRP 22 that performs the correspondingly configured network transmission, or at least it may not be the only TRP 22 involved. For example, after receiving the indication from a WCD 14, the indication can be propagated elsewhere in the network 12, to be used as needed when configuring network transmissions that target the WCD 14. In an example case, information regarding the directional reception scanning ability of the WCD 14 propagates from one TRP 22/node 10 to another, in the context of the handover of the WCD 14. Of course, to the extent that the directional reception scanning ability of the WCD 14 is not a fixed design feature but rather a dynamic ability dependent on a current operating mode or current operating conditions at the WCD 14, the network 12 may receive and propagate updated information for the WCD 14.

In an embodiment of the network node 10, the processing circuitry 56 is configured to determine the directional reception scanning ability of the WCD 14 by determining whether the WCD 14 has the ability to receive in multiple reception directions simultaneously. The processing circuitry in at least one such embodiment is configured to configure the network transmission for the WCD 14 by, in response to determining that the WCD 14 does not have the ability to receive in multiple reception directions simultaneously, restricting selection of a TRP 22 to use for performing the network transmission 16 and/or restricting selection of a transmission beamforming configuration to use for performing the network transmission 16. In a related embodiment, the processing circuitry 56 is configured to configure the network transmission 16 for the WCD 14 by selecting a TRP 22 to use for performing the network transmission 16 and/or selecting a transmission beamforming configuration to use for performing the network transmission 16.

As an example of selecting the transmission beamforming configuration to use for the network transmission, the processing circuitry 56 is configured to select a transmission beamforming direction to use for the network transmission 16 and/or select a transmission beam sweeping configuration to use for the network transmission 16. Selecting a transmission beam sweeping configuration, includes, for example, at least one of: selecting one or more transmission beamforming directions, from among a plurality of transmission beam directions included in a transmission beam sweep 34; selecting a dwell time to use for one or more of the transmission beam directions; or selecting a number to times to repeat one or more of the transmission beam directions.

If the WCD 14 does not have the ability to receive in multiple directions simultaneously and, instead, receives in one direction at a time, the processing circuitry 56 may, for example, configure a beam repetition value, wherein the network transmission 16 is repeated in each transmission beam direction. The repetition value equals, for example, the number of different reception beam directions used by the WCD 14, e.g., repeating the network transmission 16 four times in each transmission beam direction if the reception beam sweep at the WCD 14 uses four different reception beam directions and the WCD 14 can receive in only one direction at a time.

Transmission repetition at a TRP 22 covers any order of repetition. For instance, if transmission beam directions A, B and C are selected to be used and each of them should be repeated four times, e.g., for trying four receive beams in the WCD 14, the transmission beam sweep at the TRP 22 may include any of the following example beam repetition arrangements: {A, A, A, A, B, B, B, B, C, C, C, C} or {A, B, C, A, B, C, A, B, C, A, B, C}. Moreover, the network node 10 may configured the TRP 22 to use only a single transmission beam direction, at least in instances where the network node 10 has good information about which direction is likely to the best one to use for transmitting to the WCD 14, e.g., based on determining the angle of arrival for a random access preamble or another transmission from the WCD 14.

The network transmission 16 comprises a random access response to be sent in reply to a random access preamble transmitted by the WCD 14, for example. In at least one embodiment of the network node 10 and WCD 14 directed to the random-access scenario, the processing circuitry 56 is configured to determine the directional reception scanning ability of the WCD 14 from a sequence or index value of the random access preamble, the sequence or index of the random access preamble mapping to a defined directional reception scanning ability, according to a defined mapping scheme known to the network node 10 and the WCD 14. That is, the sequence or index value of the random access preamble implicitly indicates a reception beamforming attribute of the WCD 14. Some number or range of sequence or index values may be allocated or reserved, for example, for use by WCDs 14 that do not have the ability to receive in multiple beamforming directions simultaneously, while another range of sequence or index values are reserved or allocated for use by WCDs 14 that have the ability to receive in multiple beamforming directions simultaneously.

In any case, the processing circuitry 56 of the network node 10 may be configured to configure the network transmission (16)—here, a random access response or RAR-based on being configured to select at least one of a TRP 22 or a transmission beamforming configuration to use for transmitting a RAR corresponding to the random access preamble. For example, the processing circuitry 56 configures the transmission beamforming to use for transmission of the RAR by configuring any one or more of the number, size, or shape of the transmission beams used, the direction(s) to use or to prioritize, the beam dwell time, the beam repetition factor, or whether to what extent more than one transmission beam is used at a time. Such operations may be understood as tailoring the beam sweep configuration in view of the ability, or lack thereof, of the WCD 14 to receive in multiple directions simultaneously.

In another embodiment, or in another example case, the network transmission 16 comprises failure recovery signaling to be sent for connection recovery between the network 12 and the WCD 14. In response to determining that the WCD 14 does not have the ability to receive in multiple reception directions simultaneously, the processing circuitry 56 in at least one embodiment is configured to restrict transmission of the failure-recovery signaling to a TRP 22 or a transmission beamforming direction that is known to the WCD 14 in advance of the serving connection failure. The TRP 22 and/or beamforming direction may be known to the WCD 14 based on a preceding transmission of recovery information from the network 12 to the WCD 14, before the connection failure. As an example, the recovery information identifies a TRP 22 or a beam that the WCD 14 should use for re-connecting to the network 12, upon the failure of its current connection.

As suggested by the details in FIG. 5, the network node 10 in one or more embodiments, may be understood as comprising a number of processing units or modules, with the individual modules being realized according to the execution of computer program instructions via the processing circuitry 56. An example module set includes a determining module 70 that is configured to determine a directional reception scanning ability of a WCD 14, according to a capability indication signaled by the WCD 14. Further included in the example WCD 10 is a configuring module 72 that is configured to configure a network transmission 16 for the WCD 14, in dependence on the directional reception scanning ability of the WCD 14. Further, at least in cases where the network node 10 is not instantiated in the TRP 22 being configured, a transmitting module 74 may be included, where the transmitting module 74 is configured to communicate the transmission configuration information to the TRP 22.

Figure 6:
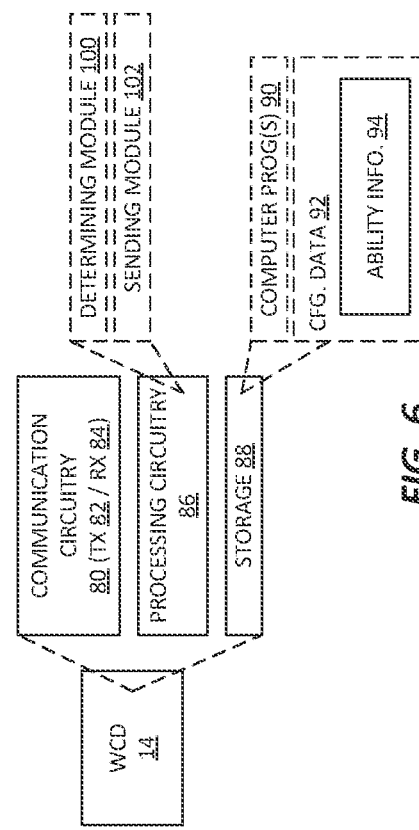
FIG. 6 is a block diagram of an example embodiment of the WCD depicted in FIG. 1.

FIG. 6 illustrates an example embodiment of the WCD 14, which may be a "User Equipment" (UE) according to the vernacular of the 3GGP, although a UE may or may not have a human user, depending on its design and intended use.

Thus, while smartphones, tablets, and other personal computing devices are representative examples of UEs, so too are the wide range of Machine Type Communication (MTC) devices of increasing prevalence in industrial and commercial monitoring and control applications, such as in the Internet-of-Things (IoT) context. Therefore, the term "WCD" denotes any wireless communication apparatus that is configured for operation with the network 12, and does not imply limitations on the feature set, intended use, or manner of use, subject to the qualification that a WCD 14 as contemplated herein sends an indication of its directional reception scanning ability, for use by the network 12 in configuring a network transmission 16 for the WCD 14, from one or more TRPs 22 in the network, as described herein.

The example WCD 14 includes communication circuitry 80 configured for wireless communication with TRPs 22 in the network 12. The communication circuitry 80 may support more than one Radio Access Technology (RAT) so that it can communicate with RANs of different types. In an example case, the communication circuitry 80 supports the frequencies, protocols, and timing of both 4G and 5G RANs. Additionally, the communication circuitry 80 may support one or more Wireless Local Area Network (WLAN) standards, such as defined by the 802.11 family of specifications. With such options in mind, the communication circuitry 80 at least includes transmitter circuitry 82 and receiver circuitry 84 that is configured for wireless communication with TRPs 22 in the RAN 20.

Further included in the WCD 14 is processing circuitry 86 that is operatively associated with the communication circuitry 80 and configured to determine a directional reception scanning ability of the WCD 14 and send a capability indication for the network 12, indicating the directional reception scanning ability of the WCD 14. In one or more example implementations, the processing circuitry 86 is configured to determine the directional reception scanning ability of the WCD 14 from capability information stored in the WCD 14 and/or dynamically, in dependence on one or more operating conditions of the WCD 14. Thus, the indicated capability may be an indication of a static property or capability at the WCD 14 or may be an indication of a dynamic property or capability at the WCD 14, e.g., one that depends on a current operating mode or current operating conditions. In one example, the WCD 14 may adapt its reception beamforming in view of its remaining battery life.

As for example signaling mechanisms, the processing circuitry 86 is configured to send the capability indication in Radio Resource Control (RRC) signaling transmitted by the WCD 14. The WCD 14 transmits the RRC signaling during any one or more of registration, re-registration, and handover, or in response to receiving a request from the network 12, or in response to fulfillment of a trigger condition for sending the capability indication.

In the same or in another embodiment, the processing circuitry 86 is configured to send the capability indication to the network 12 by sending a random access request to the network 12 that conveys the capability indication. Assume, for example, that there are four types of directional reception scanning ability. A lookup table or other data structure may map different random access preamble values—different sequence or index values—to different directional reception abilities. A given WCD 14 indicates its ability by sending a random access preamble that maps to the corresponding ability, according to the lookup table, e.g., based on the processing circuitry 86 being configured to select and transmit, as the random access request, a random access preamble, according to mapping information that maps different random access preambles to different directional reception scanning abilities.

In at least one such embodiment, in dependence on the directional reception scanning ability of the WCD 14, the processing circuitry 86 is configured to perform reception processing for a random access response expected from the network 12 in reply to the random access request. If the WCD has the ability to receive in multiple reception directions simultaneously, the receiver is configured e.g. to collect and store signal samples from all antenna elements in digital format and perform post-processing in baseband by applying multiple sets of candidate combining weights (e.g. corresponding to different Discrete Fourier Transform (DFT) beam configurations in the case of regular arrays at the WCD) and attempting RAR signal detection for each such combining weight set. If the WCD has no such ability, the receiver is configured e.g. to over multiple reception instances perform analog combining of antenna element signals corresponding to multiple predetermined reception directions and attempting RAR signal detection for each reception instance. As an example, for receiving a network transmission 16, the processing circuitry 86 is configured to configure reception beamforming at the WCD 14, in dependence on the directional reception scanning ability, wherein the directional reception scanning ability corresponds to whether the WCD 14 has the ability to scan in multiple reception directions simultaneously.

Where the WCD 14 is not able to scan in multiple reception directions simultaneously, the processing circuitry 86 is configured to configure the reception beamforming at the WCD 14 by selecting or prioritizing a particular reception beamforming direction to use for receiving the network transmission 16. Additionally, or alternatively, the processing circuitry 86 is configured to configure a set of reception beamforming directions to use for attempting to receive the network transmission 16. As a further addition, or as a further alternative, the processing circuitry 86 is configured to configure reception beamforming at the WCD 14 by configuring at least one of a dwell time or a number of reception repetitions, to use in each of one or more reception beamforming directions used by the WCD 14 for attempting to receive the network transmission 16.

Example implementations of the processing circuitry 86 include the use of dedicated or fixed circuits or the use of programmatically configured circuits or the combined use of fixed and programmed circuitry. As such, the processing circuitry 86 may comprise one or more microprocessors, digital signal processors (DSPs), field programmable gate arrays (FPGAs), application specific integrated circuits (ASICs), or other arrangements of digital processing circuitry configured according to the execution of stored computer program instructions in the form of stored software or firmware.

Correspondingly, an example implementation of the WCD 14 includes storage 88 that comprises one or more types of computer-readable storage media. The storage 88 provides, for example, volatile memory for use in the live operation of the WCD 14 and non-volatile memory for longer-term storage of one or more computer programs 90 and one or more items of configuration data 92, such as ability information 94 reflecting the directional reception scanning ability of the WCD 14 or comprising information from which the ability may be deduced. In instances where the processing circuitry 86 is based on general-purpose CPUs or other general-purpose circuitry, such general-purpose circuitry is specially adapted to carry out the operations detailed herein, based on the execution of computer program instructions from the one or more computer programs 90.

As suggested by the details in FIG. 6, the WCD 14 in one or more embodiments, may be understood as comprising a number of processing units or modules, with the individual modules being realized according to the execution of computer program instructions via the processing circuitry 86. An example module set includes a determining module 100 that is configured to determine a directional reception scanning ability of the WCD 14 and a sending module 102 that is configured to send a capability indication to the network 12, indicating the directional reception scanning ability of the WCD 14. In an example case, the ability indication is a yes-or-no flag indicating whether the WCD 14 can receive in multiple reception directions simultaneously. Alternatively, the capability indication indicates the number of reception beams to be used by the WCD 14 and whether or to what extent simultaneous reception is supported by the WCD 14.

Figure 7:
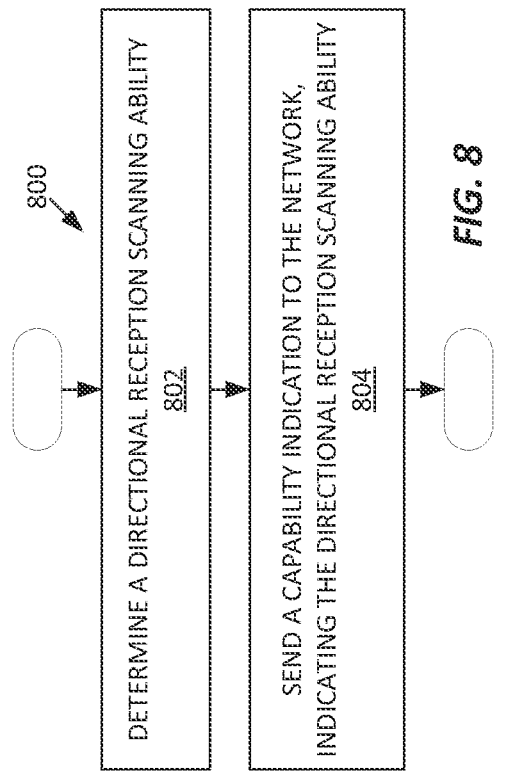
FIG. 7 is a logic flow diagram of an example embodiment of a method of operation at a network node.

FIG. 7 illustrates a method 700 of operation by a network node 10 in a wireless communication network 12. A network node 10 configured according to the example of FIG. 5 may perform the method 700, e.g., based on the execution of computer program instructions stored in the storage 58. However, the performance of the method 700 is not limited to the depicted example of the network node 10. Further, the method 700 may be performed in an order other than that suggested by the illustration or may be repeated or performed in parallel for respective WCDs 14 or in conjunction with receiving updated beam sweeping information from one or more WCDs 14. The method 700 also may be performed in conjunction with other ongoing processing at the network node 10.

The method 700 includes the network node 10 determining (Block 702) a directional reception scanning ability of a WCD 14, according to a capability indication signaled by the WCD 14. The method 700 further includes configuring (Block 704) a network transmission 16 for the WCD 14, in dependence on the directional reception scanning ability of the WCD 14.

Determining (Block 702) the directional reception scanning ability of the WCD 14 comprises, for example, determining whether the WCD 14 has the ability to receive in multiple reception directions simultaneously. Configuring (Block 704) the network transmission 16 for the WCD 14 comprises, for example, restricting selection of a network TRP 22 to use for performing the network transmission 16 and/or restricting selection of a transmission beamforming configuration to use for performing the network transmission 16, in response to determining that the WCD 14 does not have the ability to receive in multiple reception directions simultaneously.

Configuring the network transmission 16 for the WCD 14 in another example embodiment of the network node 10 comprises at least one of selecting a TRP 22 to use for performing the network transmission 16 or selecting a transmission beamforming configuration to use for performing the network transmission 16. Selecting the transmission beamforming configuration comprises, for example, at least one of selecting a transmission beamforming direction to use for the network transmission 16 or selecting a transmission beam sweeping configuration to use for the network transmission 16. Selecting the transmission beam sweeping configuration includes at least one of: selecting one or more transmission beamforming directions, from among a plurality of transmission beam directions included in a transmission beam sweep 34; selecting a dwell time to use for one or more of the transmission beam directions; or selecting a number to times to repeat one or more of the transmission beam directions.

The method 700 comprises, for example, a random access method for supporting random access to the network 12 by the WCD 14, wherein determining (Block 702) the directional reception scanning ability of the WCD 14 comprises determining the directional scanning ability of the WCD 14 in dependence on a random access preamble transmitted by the WCD 14 as a random access request. Here, the sequence or index of the random access preamble maps to a defined directional reception scanning ability, according to a defined mapping scheme known to the network node 10 and the WCD 14. Further in this embodiment of the method 700, configuring (Block 704) the network transmission 16 for the WCD 14 comprises selecting at least one of a TRP 22 or a transmission beamforming configuration to use for transmitting a random access response corresponding to the random access request.

In a further embodiment, which may be used in addition to or in the alternative to the random-access variation of the method 700, the method 700 comprises a serving connection failure recovery method for supporting connection failure recovery between the network 12 and the WCD 14. Here, configuring the network transmission 16 for the WCD 14 comprises, in response to determining that the WCD 14 does not have the ability to receive in multiple reception directions simultaneously, restricting failure-recovery signaling transmissions subsequent to a serving connection failure to use a TRP 22 or a transmission beamforming direction that is known to the WCD 14 in advance of the serving connection failure.

Figure 8:
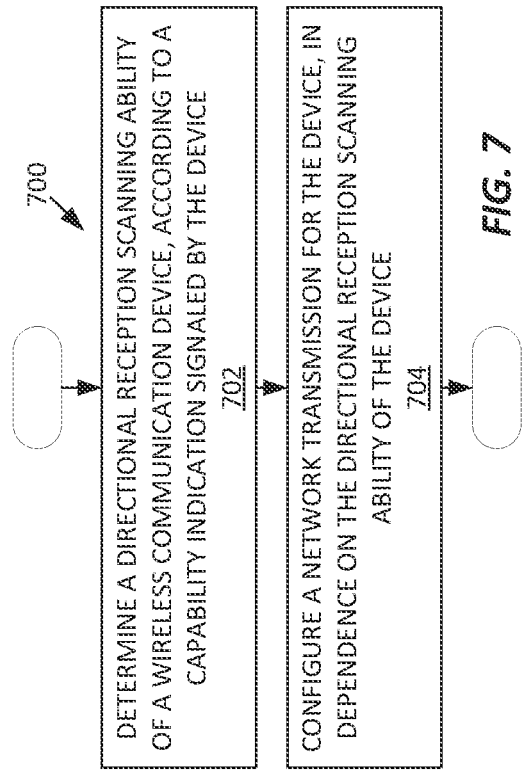
FIG. 8 is a logic flow diagram of an example embodiment of a method of operation at a WCD.

FIG. 8 illustrates a method 800 of operation by a WCD 14 in a wireless communication network 12. A WCD 14 configured according to the example of FIG. 6 may perform the method 800, e.g., based on the execution of computer program instructions stored in the storage 88. However, the performance of the method 800 is not limited to the depicted example of the WCD 14. Further, the method 800 may be performed in an order other than that suggested by the illustration or may be repeated or performed along with other, ongoing processing in the WCD 14.

The method 800 includes the WCD 14 determining (Block 802) a directional reception scanning ability of the WCD 14 and sending (Block 804) a capability indication to the network (12), indicating the directional reception scanning ability of the WCD 14. The directional reception scanning ability of the WCD 14 comprises, for example, any one or more of the ability or lack thereof of receiving in multiple beam directions simultaneously, or the number of reception beams used by the WCD 14 for directional reception.

Determining (Block 802) the directional reception scanning ability of the device (14) comprises at least one of determining the directional reception scanning ability from capability information stored in the WCD 14 or determining the directional reception scanning ability dynamically, in dependence on one or more operating conditions of the WCD 14.

Sending (Block 804) the capability indication to the network (12) comprises sending Radio Resource Control (RRC) signaling for the network 12 that conveys the capability indication or sending a random access request for the network 12 that conveys the capability indication. The WCD 14 may do one or the other, or both, depending on circumstances.

The method 800 in one or more embodiments further includes, in dependence on the directional reception scanning ability of the WCD 14, the WCD 14 configuring reception processing for a random access response expected from the network 12 in reply to the random access request. That is, the WCD 14 indicates a certain ability to the network 12 and configures its corresponding reception processing consistent with the indicated ability.

In one example applied to the random-access context, transmitting a random access request from the WCD 14 comprises selecting and transmitting a random access preamble, according to mapping information that maps different random access preambles to different directional reception scanning abilities. Use of the random access preamble to indicate a directional reception scanning ability of the WCD 14 represents an advantageous use of implicit signaling, wherein the value of the random access preamble, e.g., the sequence or index value, implicitly indicates the ability, based on defined associations between different sequence or index values and different directional reception scanning abilities. In one example, the WCD 14 stores preconfigured information defining the mapping, and in another example, the network 12 indicates the mapping, e.g., via broadcasted system information.

For receiving a network transmission 16, the method 800 may include the WCD 14 configuring reception beamforming at the WCD 14, in dependence on the directional reception scanning ability. Where the directional reception scanning ability corresponds to whether the WCD 14 has the ability to scan in multiple reception directions simultaneously, and, where the WCD 14 is not able to scan in multiple reception directions simultaneously, configuring the reception beamforming at the WCD 14 comprises, for example, selecting or prioritizing a particular reception beamforming direction to use for receiving the network transmission 16. Additionally, or alternatively, configuring the reception beamforming at the WCD 14 comprises configuring a set of reception beamforming directions to use for attempting to receive the network transmission 16. As a further addition or alternative, configuring the reception beamforming at the WCD 14 comprises configuring at least one of a dwell time or a number of reception repetitions, to use in each of one or more reception beamforming directions used by the WCD 14 for attempting to receive the network transmission 16.

With the above examples of node and device operations in mind, a WCD 14 and a network node 10 that are respectively configured according to any of the above example embodiments together form a wireless communication system, in which the WCD 14 is configured to indicate a directional reception scanning ability to the network 12, and the network node 10 configures a corresponding network transmission 16, in dependence on the indicated directional scanning ability of the WCD 14.

Figure 9:
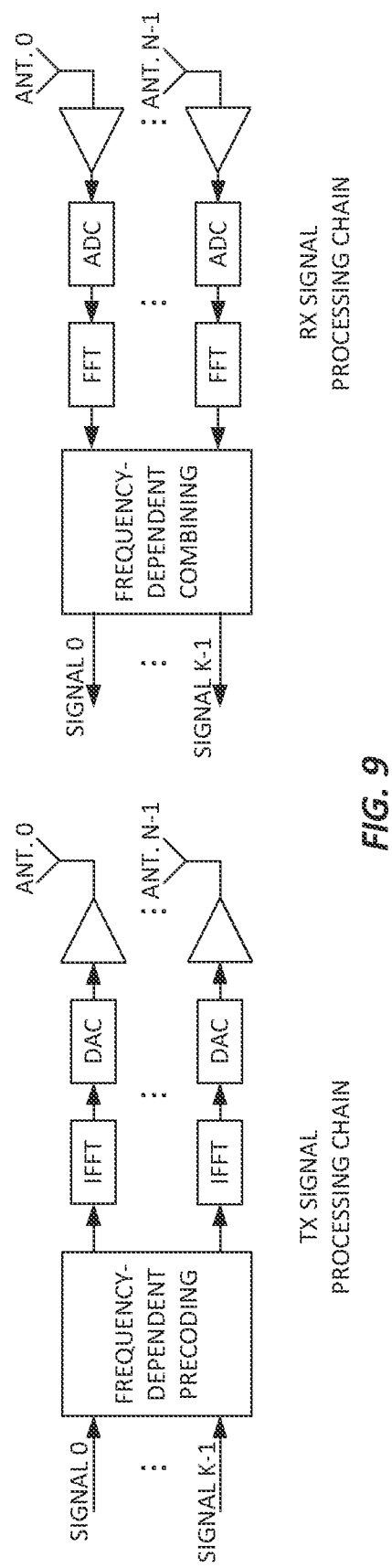
FIG. 9 is a block diagram of an example embodiment of communication circuitry at a WCD that is configured for baseband transmission and reception beamforming, also referred to as digital beamforming.

Example directional reception scanning abilities depend on whether the WCD 14 uses analog or digital beamforming, with the left portion of FIG. 9 illustrating transmitter circuitry configured for digital beamforming for directional transmission by the WCD 14 and the right portion illustrating receiving circuitry configured for directional reception by the WCD 14. For transmission, the example transmit signal chain in the WCD 14 includes frequency-dependent precoding of signals 0 through K−1, along with the application of an Inverse Fast Fourier Transform (IFFT) to the respective signals after precoding, followed by a Digital-to-Analog Conversion (DAC) and power amplification for transmission via a respective one of the antennas or antenna elements in the antenna array of the WCD 14. For reception, the example receive signal chain in the WCD 14 includes Analog-to-Digital Conversion (ACD) for each of the antenna-received signals, followed by application of a Fast Fourier Transform (FFT) to each of the digitized per-antenna signals, which is then followed by frequency-dependent combining to recover respective signals 0 through K−1.

Figure 10:
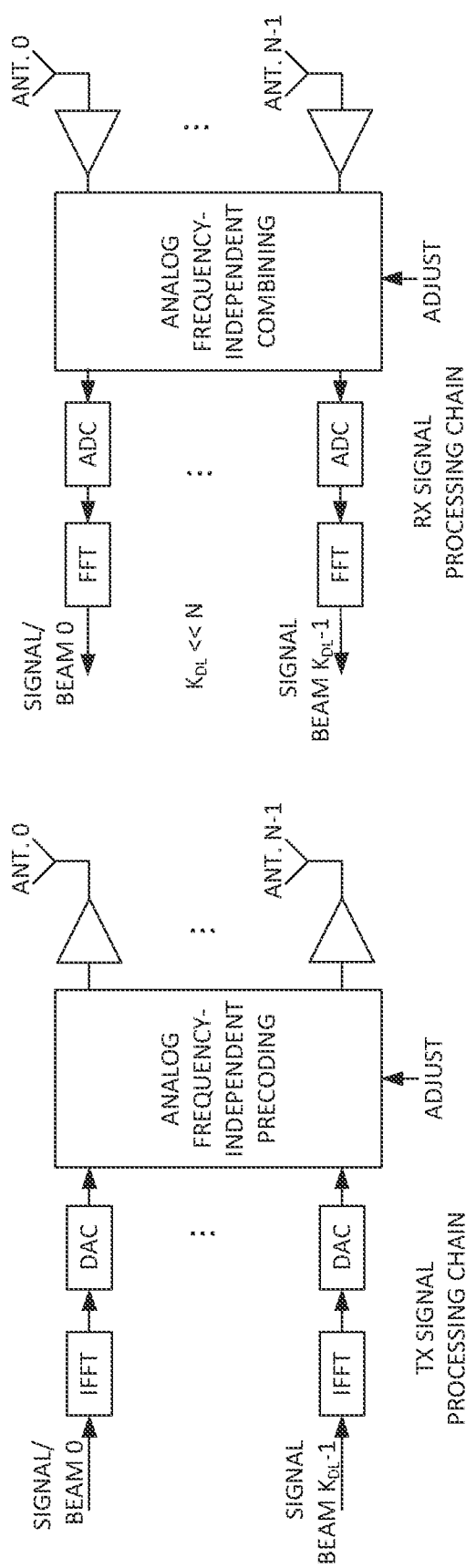
FIG. 10 is a block diagram of an example embodiment of communication circuitry at a WCD that is configured for radio frequency (RF) transmission and reception beamforming, also referred to as analog beamforming.

A notable property of digital beamforming for transmission or reception is that multiple beams may be used simultaneously, because the beamforming (precoding or combining) happens in the baseband, rather than in the analog domain at RF, such as is depicted in FIG. 10. The left side of FIG. 10 illustrates an example transmit signal chain for the WCD 14 in an analog beamforming implementation while the right portion depicts an example receive signal chain for the WCD 14 in an analog beamforming implementation. For transmission, the signals to be transmitted undergo IFFT processing, DAC, and then feed into a frequency-independent analog precoder, which then feeds into the power amplifiers associated with the respective transmit antennas or antenna elements of the WCD 14. Essentially the inverse occurs in the example receive signal chain shown on the right, where the antenna-received signals undergo analog combining for directional reception, and the corresponding output signals are then digitized for FFT processing. The analog combining here involves applying per-antenna-element weights, resulting in desired spatial properties for the antenna array.

In a variation of analog versus digital beamforming, the WCD 14 may use a hybrid approach wherein, for an angular range of interest, the WCD 14 can receive in several broader beam directions simultaneously, in the analog domain, and then use digital baseband processing—post-processing—to subdivide each of the broader reception beams into narrower beams. Broadly, being able to receive in multiple beam directions simultaneously may be based on the ability to perform analog beamforming simultaneously in two more directions, or being able to perform, e.g., an omnidirectional reception, followed by directional processing of the buffered omnidirectional signal samples in the baseband.

Figure 11:
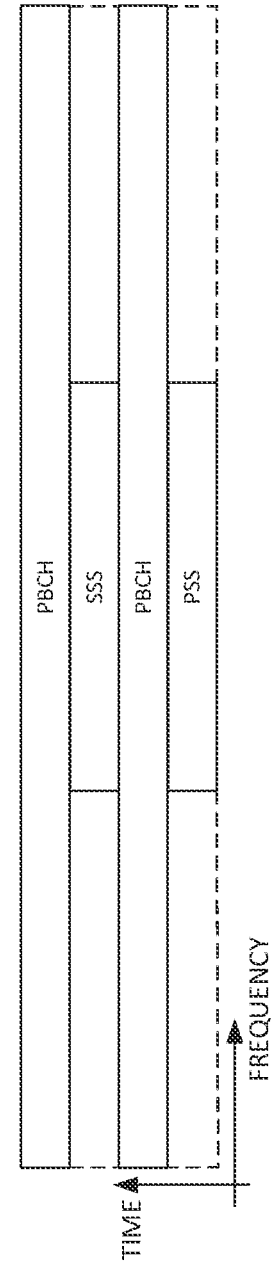
FIG. 11 is a diagram of a Synchronization Signal Block (SSB) in an example case, such as may be directionally transmitted by a TRP, for detection by a WCD.

FIG. 11 illustrates a Synchronization Signal Block (SSB), as might be transmitted by a TRP 22 in an NR-based configuration. The SSB has dimensions in time and frequency and includes Physical Broadcast Channels (PBCHs) along with a Primary Synchronization Signal (PSS) and a Secondary Synchronization Signal (SSS). The PSS/SSS enable a WCD 14 to synchronize with the TRP 22 that transmits the SSB, and thereby obtain the PBCHs, which in turn allow the WCD 14 to receive "system information" regarding the resources to use for system access, etc.

The SSB stands as an example of the type of downlink reference signal or signals that TRPs 22 may transmit in dependence on the indicated directional reception scanning ability of a WCD 14. Correspondingly, FIG. 12 illustrates the transmission by a TRP of SSBs in a burst arrangement. Transmission parameters that may be configured for transmission of SSBs by a TRP 22 in dependence on the directional reception scanning ability of a WCD 14 include any one or more of the number of SSBs used, the number of SSB bursts used, the number of SSBs included in a burst, the number of different SSB sets used, and the number of SSBs in a set.

FIG. 13 illustrates an example signal flow between a TRP 22/network node 10 and a WCD 14 in a random-access context. The TRP 22 transmits a synchronization signal, e.g., an SSB, which the WCD 14 detects. In response to the detection, the WCD 14 transmits a random access request, where the random access request comprises a random access preamble that indicates a directional reception scanning ability of the WCD 14. The TRP 22 receives the random access preamble and the network node 10, which may be integrated with or apart from the TRP 22, determines the directional reception scanning ability of the WCD 14, based on the random access preamble.

The network node 10 configures the corresponding RAR transmission for the WCD 14, in dependence on the indicated directional reception scanning ability, e.g., it chooses which TRP 22 (or TRPs 22) to use for transmitting the RAR and/or configures transmission beamforming at the one or more involved TRPs 22, in dependence on the indicated directional reception scanning ability. As one example, if the WCD 14 indicated that it can receive in all of its reception beamforming directions simultaneously, the network node 10 may configure the TRP(s) 22 to transmit the RAR omnidirectionally, or, if power constraints permit, it may configure the transmission of the RAR in all transmission beam directions simultaneously, or it may transmit in all transmission beam directions according to a beam activation sequence but transmit only once in each direction, rather than repeating the transmission in each direction.

Conversely, if the WCD 14 indicates that it cannot receive in multiple directions simultaneously, the network node 10 may configure transmission beamforming of the RAR at the TRP(s) 22 to use beam repetition. For example, the involved TRP(s) 22 are configured to repeat the RAR transmission in each transmission beamforming direction, e.g., where the number of repetitions equals the number of reception beams sequentially scanned through at the WCD 14.

FIG. 14 illustrates an example signal flow between a WCD 14 and a TRP 22/network node 10, for failure recovery. Assuming an existent connection supporting ongoing communication between the network 12 and the WCD 14, the WCD 14 indicates a directional reception scanning ability, and the network node 10 determines connection recovery information in dependence on the indicated ability. For example, it determines which TRP(s) 22 and/or which transmission beam(s) should be used for recovering a connection with the WCD 14 in response to a failure of the current connection.

The network node 10 indicates the recovery information to the WCD 14, e.g., by sending it via one or more TRPs 22 currently having a connection to the WCD 14. Subsequently, in response to detecting a failure of the current connection, the WCD 14 and the network 12 perform connection recovery in accordance with the determined recovery information. For example, the WCD 14 attempts to connect to one or more of the one or more TRPs 22 identified in the recovery information signaled to it, and the network node 10 configures recovery signaling from those one or more TRPs 22 in dependence on the directional reception scanning ability of the WCD 14.

A beamforming direction to use for connection failure recovery at the WCD 14 may, therefore, be known to the WCD 14, for example, based on previously-received signaling that established a TRP 22 and/or a transmission beam as a recovery or backup TRP or transmission beam.

As for aspects of communication between the WCD 14 and the network 12 related to random access, random access procedures are used initial system access, the transition from idle to active mode, and in handovers. Random access represents a critical part of efficient design for wireless communication networks. A contemplated embodiment of random access in a 5G/NR context involves four steps.

Assume that two TRPs 22, denoted TRP A and TRP B, each transmit SSBs, which a WCD 14 receives with a relative timing difference.

The WCD 14 selects a downlink (DL) timing reference based on the SSB(s) received from TRP A, for example, and transmits a Random Access Channel (RACH) preamble based on the selected DL timing. Both TRP A and TRP B might detect the RACH preamble transmission, such that they may both transmit a RAR. Or, through coordination, only one of them may send a RAR, despite the RACH preamble being received at both TRP A and TRP B.

A WCD 14 lacking the ability to scan in multiple reception directions simultaneously may assume that the RAR transmitted by the network 12 in response to its PRACH transmission will be transmitted in "quasi-co-location" with the SSB transmission it selected for establishing the DL timing reference. That is, it may assume or require that the network 12 send the RAR using the same transmission beam—direction, shape, etc.—that was used to transmit the SSB selected by the WCD 14.

However, as one example advantage of the WCD 14 indicating its directional reception scanning ability, the network 12 may choose to transmit the RAR in a manner that is more efficient or that better suits resource loading at one or more neighboring TRPs 22, rather than necessarily transmitting the RAR in quasi co-location with the SSB used by the WCD 14 for establishing its DL timing reference. For example, if the WCD 14 indicates that it cannot receive in more than one direction at a time, the network node 10 selects the TRP 22 and transmission beam associated with the SSB used by the WCD 14 for establishing its downlink timing reference, so that the RAR transmission is quasi-co-located with that SSB transmission—i.e., has substantially the same spatial properties. However, if the WCD 14 indicates that it can receive in multiple directions simultaneously, e.g., if it indicates that it uses digital beamforming, then the network node 10 may choose a different TRP 22 and/or transmission beam to use for transmitting the RAR, or it may transmit the RAR omnidirectionally from one or more TRPs 22.

In such embodiments, such as in a 5G/NR context, there may be a defined corresponding between RACH resources and SSB transmissions, such that the particular SSB the WCD 14 selected for use establishing its DL timing reference can be discerned at the network 12, based on which RACH resource—e.g., time and/or frequency resources—the WCD 14 used for its RACH transmission. More broadly in the random-access context, in response to the WCD 14 indicating its directional reception scanning ability, the network 12 uses the information to configure the corresponding DL RAR signal transmission.

As a specific example, the PRACH preamble group selection by the WCD 14 operates as an implicit indication of whether the WCD 14 uses analog or digital beamforming for directional reception or, more broadly, indicates its reception sweeping/scanning capability with respect to a single DL transmission, e.g., spanning a set of OFDM symbols. Correspondingly, a network node 10 as described herein adapts the corresponding RAR transmission strategy in dependence on the indicated ability.

For example, a default mode restricts TRP selection to the TRP 22 that transmitted the SSB relied upon by the WCD 14, with the default mode being used in the absence of having information about the directional reception scanning ability of the WCD 14 or being used when the WCD 14 indicates that it can receive in only one direction at a time. A second mode allows for the network node 10 to select a TRP 22 and or a transmission beam that is different than the one associated with the SSB relied upon by the WCD 14, with the second mode being selectable at least one the WCD 14 indicates that it uses digital beamforming for reception or otherwise indicates that it can receive in multiple directions simultaneously. A similar modal operation may be applied to other signaling, such as connection or beam failure recovery signaling. Again, the WCD 14 may indicate its directional reception scanning ability during initial connection, whenever transitioning from idle to the connected state, as requested, or responsive to some other trigger condition.

The contemplated technique improves access performance and network deployment flexibility, based on adapting one or more types of network transmissions to match the directional reception scanning abilities of the WCDs 14 involved in the network transmissions. As one example, the contemplated technique allows for the indication of silent nodes, which are TRPs 22 that do not transmit pilot signals in one or more cells or beam directions in support of random-access procedures for WCDs 14 that implement digital beamforming for reception. That is, for a WCD 14 that is known to use digital beamforming for reception, the network 12 may "skip" the transmission of pilots or other supporting signals from at least one TRP 22, based on knowledge that the WCD 14 is able to receive such transmissions from one or more other TRPs 22, in view of the use of digital beamforming at the WCD 14.

Other abilities that the WCD 14 may convey to the network 12 in preparation for RAR reception, in addition to indicating analog or digital RX beamforming, include, for example, whether the WCD 14 supports directional reciprocity and, in case the WCD 14 uses analog reception beamforming, the number of reception beams it uses at least one it does not have information about the best direction or directions to use. As noted, the WCD 14 may indicate its ability or abilities implicitly, based on there being different groups or ranges of random access preambles, with the different groups or ranges mapping to different abilities. With a greater number of defined groups, the WCD 14 can indicate more detailed ability information, e.g., where each group corresponds to a combination or set of directional reception abilities.

Note that in case a group of SSB beams/transmissions are associated with the same PRACH occasion, preamble groups may be used to identify specific SSB beams/transmissions. Each such preamble group may be divided into, e.g. two subgroups, with each subgroup indicating either analog or digital reception beamforming. Another way of achieving the same result would be to first divide the available preambles into two groups, one for indication of analog reception beamforming and one for indication of digital reception beamforming. Then, when the preamble groups for SSB-within-group-indications are put together, each such group is formed by taking a few preambles from the group indicating analog reception beamforming and a few preambles from the group indicating digital RX beamforming.

As another example, different groups of SSBs are associated with different types of reception beamforming. The WCD 14 then selects a group of SSBs depending on its reception beamforming ability/abilities. Each group of SSBs is associated with different RACH preambles, such the PRACH preamble selected by the WCD 14 informs the network 12 of the beamforming ability/abilities of the WCD 14. For example, one group of SSBs might be associated with single RAR transmission, suitable for a WCD 14 which can receive the RAR in the same direction as the SSB, while another group of SSB might be associated with reception of several RARs, suitable for WCDs 14 that use digital beamforming for directional reception. The association between SSB and beamforming (or RAR reception) might be pre-configured or may be indicated via broadcast channels, e.g., PBCH, RMSI, or OSI.

Using predetermined preamble groups is a useful means for conveying information at the PRACH preamble transmission stage, but the approach requires fragmenting the preamble range. As an alternative, different PRACH transmission resources, e.g., time/frequency resources, may be associated with different directional reception scanning abilities. For example, the regular PRACH transmission resources may be divided into two groups, e.g., such that every second PRACH occasion would be dedicated for WCDs 14 that use analog beamforming and every other second PRACH occasion would be dedicated for WCDs 14 capable of digital RX beamforming. Of course, a network 12 may be configured to use both PRACH preamble grouping and PRACH resource allocations, to indicate directional reception scanning abilities.

One such approach uses two groups of preambles and two groups of PRACH occasions, which, together enable the signaling of four directional reception scanning categories. The four categories, for example, are (1) analog reception beamforming (single reception direction), no support for directional reciprocity, (2) analog reception beamforming (single reception direction), support for directional reciprocity, (3) digital reception beamforming (multiple reception directions), no support for directional reciprocity, and (4) digital reception beamforming (multiple reception directions), support for directional reciprocity. Based on whether the WCD supports directional reciprocity, the NW can adapt its RAR signal transmission and determine to which degree NW flexibility features may be invoked. For example, for a WCD in category (2), the NW may transmit the RAR so that it best matches the WCD reception ability, although it may be non-quasi-co-located (non-QCL) with the SSB transmission. For a WCD without directional reciprocity, the NW typically applies RAR precoding that matches the relevant SSB precoding. As another example, the indication of reciprocity capability by the WCD may indicate to the NW that the WCD will be transmitting msg 3 following the RAR in the UL using precoding that matches RAR reception; otherwise, the UE may transmit the msg 3 without any optimized beamforming. This allows proper configuration of the msg 3 receiver.

The relevant network standards may define the mapping of RA preamble groups to directional reception scanning abilities. The groups may be differentiated in terms of any one or more of root sequences, cyclic shifts, and time and frequency offsets with respect to the corresponding SSB transmission. The group selection may follow the same principles as 3GPP agreements of different preamble groups for requesting different sizes of transmission resource allocations for Msg3.

As regards the WCD 14 configuring itself to perform RAR reception operations according to its indicated directional reception scanning ability, if a single direction can be handled in each reception instance, the WCD 14 attempts RAR reception using the reception beamforming configuration that was optimized based on the previous SSB reception that triggered the PRACH preamble transmission. If the WCD 14 supports reception in multiple directions simultaneously, the WCD 14 digitizes and buffers per-antenna element signals and attempts RAR detection during baseband processing, based on applying additional effective reception directions in addition to the SSB reception direction.

Other example details on the network side include a network node 10 receiving uplink signaling from a WCD 14 that indicates a directional reception scanning ability of the WCD 14. In the random-access context, the network node 10 configures a RAR transmission to "match" the indicated ability of the WCD 14. Here, the "ability" may be a composite of two or more reception beamforming properties—e.g., the ability may reflect two or more aspects of the reception beamforming capabilities of the WCD 14. As an example of adapting the RAR transmission in view of the indicated ability of the WCD 14, the network node 10 may arrange to have the RAR transmitted from the same TRP 22 as the SSB indicated by the received preamble, in response to the WCD 14 indicating that it can receive in only one direction at time. As a further advantage, the network node 10, possibly in cooperation with other network nodes 10, avoids transmitting the RAR from TRPs 22 and/or transmission beams other than the TRP/beam used for the SSB.

However, if the WCD 14 indicates that it can receive in more than one direction at a time, the network node 10 has more flexibility in configuring the RAR transmission. For example, the network node 10 arranges to have the RAR transmission performed from another TRP 22 and/or using other beam directions. Alternatively, the network node 10 may use the same TRP 22 used for transmitting the SSB but may relax or otherwise adjust one or more of the beamforming parameters, e.g., antenna weights, to alter the shape of the beam, e.g., making it wider. That is, even when the RAR is transmitted from the same TRP 22 as the SSB, the RAR transmission may not be QCL with the SSB transmission.

In review, in at least one embodiment, if a single reception occasion is available to a WCD 14 that uses analog beamforming for reception, the network node 10 adapts the network transmission 16 to use a single predictable direction, e.g., from a TRP 22 and/or transmission beam known to the WCD 14; if a single reception occasion is available to a WCD 14 that uses digital beamforming for reception, the network node 10 adapts the network transmission 16 to transmit from any desired direction, e.g., from any desired TRP 22 and/or transmission beam, where "desired" denotes selection based on improving network efficiency, lowering interference, reducing power, decreasing resource usage, etc.; and, if multiple reception occasions are available to a WCD 14 that uses analog beamforming for reception, the network node 10 adapts the network transmission 16 by repeating transmission from an unpredictable direction, as defined by the selected TRP 22 or transmission beam, the number of times required for the WCD 14 to sweep over the involved coverage area, i.e., the number of times associated with the WCD 14 trying all relevant reception beam directions.

The number of random-access preambles configured for indicating the use of analog reception beamforming and the number of preambles configured for indicating digital reception beamforming does not have to be equal. For example, in a scenario where WCDs 14 using analog reception beamforming dominate in the network 12, the group of preambles indicating analog reception beamforming may contain more preambles than the group of preambles indicating digital reception beamforming. Further, the preamble groups may be reconfigured as needed, so that the group of preambles indicating digital reception beamforming may contain more preambles than the group of preambles indicating analog reception beamforming.

With such example details in mind, a WCD 14 in one or more embodiments performs a method that includes selecting a random access preamble to use for making a random access attempt towards the network 12 from a random access preamble group that maps to directional reception scanning ability of the WCD 14, according to a defined mapping between one or more defined abilities and one or more respective random access preamble groups. The method further includes the WCD 14 making the random access attempt using the selected preamble, for implicitly indicating the ability as part of the random access attempt. The WCD 14 learns the defined mapping from system information transmitted by a radio network node of the wireless communication network, for example. In at least one embodiment, the indicated ability indicates the use of analog beamforming for directional reception at the WCD 14 or the use of digital beamforming for direction reception at the WCD 14.

A complementary method at a network node 10 includes receiving a random access preamble from a WCD 14 making a random access attempt towards the network 12 and determining a directional reception scanning ability of the WCD 14 implicitly, by determining whether the random access preamble belongs to one of one or more random access preamble groups that, according to a defined mapping, maps to a defined directional reception scanning ability. The method further includes performing at least one of initiating storage of the indicated ability in "context" information maintained in the network 12 for the WCD 14; and adapting a RAR or other network transmission 16 for the WCD 14, in dependence on the indicated ability.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method performed by one or more Transmission/Reception Points (TRPs) in a wireless communication network, wherein each of the TRPs transmits a plurality of beams, the method comprising:
  transmitting a plurality of synchronization signal blocks (SSBs) or downlink reference signals indicating beams for a random access response (RAR) for a wireless communication device;
  determining a directional reception scanning ability of the wireless communication device, according to a capability indication signaled by the device; and
  configuring a network transmission for the device, in dependence on the directional reception scanning ability of the device,
  wherein configuring the network transmission for the device comprises selecting a transmission beam sweeping configuration, including one or more of:
    selecting the TRP transmitting the SSBs or downlink reference signals; and
    selecting a TRP and/or a beam that is different from a TRP that is associated with the SSBs or downlink reference signals.

2. The method of claim 1, wherein determining the directional reception scanning ability of the device comprises determining whether the device has the ability to receive in multiple reception directions simultaneously.

3. The method of claim 1, wherein configuring the network transmission for the device comprises at least one of: selecting a transmission/reception point to use for performing the network transmission; or selecting a transmission beamforming configuration to use for performing the network transmission.

4. The method of claim 3, wherein selecting the transmission beamforming configuration comprises at least one of: selecting a transmission beamforming direction to use for the network transmission; or selecting a transmission beam sweeping configuration to use for the network transmission.

5. The method of claim 1, wherein selecting the transmission beam sweeping configuration further includes at least one of: selecting a dwell time to use for one or more of the transmission beam directions; and selecting a number of times to repeat one or more of the transmission beam directions.

6. The method of claim 1, wherein the method comprises a random access method for supporting random access to the network by the device, and wherein:
determining the directional reception scanning ability of the device comprises determining the directional scanning ability of the device in dependence on a random access preamble transmitted by the device as a random access request, the sequence or index of the random access preamble mapping to a defined directional reception scanning ability, according to a defined mapping scheme known to the network node and the device; and
configuring the network transmission for the device comprises selecting at least one of a Transmission/Reception Point or a transmission beamforming configuration to use for transmitting a random access response corresponding to the random access request.

7. The method of claim 1, wherein the method comprises a serving connection failure recovery method for supporting connection failure recovery between the network and the device, and wherein configuring the network transmission for the device comprises, in response to determining that the device does not have the ability to receive in multiple reception directions simultaneously, restricting failure-recovery signaling transmissions subsequent to a serving connection failure, to use a Transmission/Reception Point or a transmission beamforming direction that is known to the device in advance of the serving connection failure.

8. A Transmission/Reception Point (TRP) in a wireless communication network, wherein the TRP transmits a plurality of beams, the TRP comprising:
communication circuitry configured for wireless communication with wireless communication devices, or configured for inter-nodal communication with another network node in the network that is configured for wireless communication with wireless communication devices; and
processing circuitry operatively associated with the communication circuitry and configured to:
transmit a plurality of synchronization signal blocks (SSBs) or downlink reference signals indicating beams for a random access response (RAR) for a wireless communication device;
determine a directional reception scanning ability of a wireless communication device, according to a capability indication signaled by the device; and
configure a network transmission for the device, in dependence on the directional reception scanning ability of the device,
wherein configuring the network transmission for the device comprises selecting a transmission beam sweeping configuration, including one or more of:
selecting the TRP transmitting the SSBs or downlink reference signals; and
selecting a TRP and/or a beam that is different from a TRP that is associated with the SSBs or downlink reference signals.

9. The network node of claim 8, wherein the processing circuitry is configured to determine the directional reception scanning ability of the device by determining whether the device has the ability to receive in multiple reception directions simultaneously.

10. The network node of claim 8, wherein the processing circuitry is configured to configure the network transmission for the device by at least one of: selecting a transmission/reception point to use for performing the network transmission; or selecting a transmission beamforming configuration to use for performing the network transmission.

11. The network node of claim 10, wherein, as said selecting the transmission beamforming configuration, the processing circuitry is configured to select a transmission beamforming direction to use for the network transmission and/or select a transmission beam sweeping configuration to use for the network transmission.

12. The network node of claim 8, wherein the processing circuitry is configured to select the transmission beam sweeping configuration by performing at least one of: and selecting a number to times to repeat one or more of the transmission beam directions.

13. The network node of claim 8, wherein the network transmission comprises a random access response to be sent in reply to a random access preamble transmitted by the wireless device, and
wherein the processing circuitry is configured to determine the directional reception scanning ability of the device from a sequence or index value of the random access preamble, the sequence or index of the random access preamble mapping to a defined directional reception scanning ability, according to a defined mapping scheme known to the network node and the device; and
wherein, to configure the network transmission, the processing circuitry is configured to select at least one of a Transmission/Reception Point or a transmission beamforming configuration to use for transmitting a random access response corresponding to the random access preamble.

14. The network node of claim 8, wherein the network transmission comprises failure recovery signaling to be sent for connection recovery between the network and the device, and wherein, in response to determining that the device does not have the ability to receive in multiple reception directions simultaneously, the processing circuitry is configured to restrict transmission of the failure-recovery signaling to a Transmission/Reception Point or a transmission beamforming direction that is known to the device in advance of the serving connection failure.

15. A method of operation by a wireless communication device configured for operation with a wireless communication network, the method comprising:
receiving one or more synchronization signal blocks (SSBs) or downlink reference signals indicating resources for system access from one or more Transmission/Reception Points (TRPs);
determining a directional reception scanning ability of the device; and
sending a capability indication to the network, indicating the directional reception scanning ability of the device; and
for receiving a network transmission that comprises a random access response (RAR), configuring reception beamforming at the device from one or more TRPs in dependence on the directional reception scanning ability, wherein the directional reception scanning ability corresponds to whether the device has the ability to scan in multiple reception directions simultaneously, and where the device is not able to scan in multiple reception directions simultaneously, configuring the reception beamforming at the device comprises selecting a particular reception beamforming direction corresponding to one of the received SSBs or downlink reference signals.

16. The method of claim 15, wherein determining the directional reception scanning ability of the device comprises at least one of:
determining the directional reception scanning ability from capability information stored in the device; or
determining the directional reception scanning ability dynamically, in dependence on one or more operating conditions of the device.

17. The method of claim 15, wherein sending the capability indication to the network comprises sending Radio Resource Control signaling for the network that conveys the capability indication.

18. The method of claim 15, wherein sending the capability indication to the network comprises sending a random access request for the network that conveys the capability indication.

19. The method of claim 18, further comprising, in dependence on the directional reception scanning ability of the device, configuring reception processing for a random access response expected from the network in reply to the random access request.

20. The method of claim 18, wherein sending the random access request comprises selecting and transmitting a random access preamble, according to mapping information that maps different random access preambles to different directional reception scanning abilities.

21. The method of claim 15, further comprising, for receiving a network transmission, configuring reception beamforming at the device, in dependence on the directional reception scanning ability, wherein the directional reception scanning ability corresponds to whether the device has the ability to scan in multiple reception directions simultaneously, and, where the device is not able to scan in multiple reception directions simultaneously, configuring the reception beamforming at the device comprises configuring a set of reception beamforming directions to use for attempting to receive the network transmission.

22. The method of claim 15, further comprising, for receiving a network transmission, configuring reception beamforming at the device, in dependence on the directional reception scanning ability, wherein the directional reception scanning ability corresponds to whether the device has the ability to scan in multiple reception directions simultaneously, and, where the device is not able to scan in multiple reception directions simultaneously, configuring the reception beamforming at the device comprises configuring at least one of a dwell time or a number of reception repetitions, to use in each of one or more reception beamforming directions used by the device for attempting to receive the network transmission.

23. A wireless communication device configured for operation with a wireless communication network, the device comprising:
communication circuitry configured for wireless communication with transmission/reception points in the network; and
processing circuitry operatively associated with the communication circuitry and configured to:
receive one or more synchronization signal blocks (SSBs) or downlink reference signals indicating resources for system access from one or more Transmission/Reception Points (TRPs);
determine a directional reception scanning ability of the device; and
send a capability indication to the network, indicating the directional reception scanning ability of the device; and
for receiving a network transmission that comprises a random access response (RAR), configure reception beamforming at the device from one or more TRPs in dependence on the directional reception scanning ability, wherein the directional reception scanning ability corresponds to whether the device has the ability to scan in multiple reception directions simultaneously, and where the device is not able to scan in multiple reception directions simultaneously, configure the reception beamforming at the device by a process that comprises selecting a particular reception beamforming direction corresponding to one of the received SSBs or downlink reference signals.

24. The device of claim 23, wherein the processing circuitry is configured to determine the directional reception scanning ability of the device from capability information stored in the device and/or dynamically, in dependence on one or more operating conditions of the device.

25. The device of claim 23, wherein the processing circuitry is configured to send the capability indication in Radio Resource Control signaling transmitted by the device.

26. The device of claim 23, wherein the processing circuitry is configured to send the capability indication to the network by sending a random access request to the network that conveys the capability indication.

27. The device of claim 26, wherein, in dependence on the directional reception scanning ability of the device, the processing circuitry is configured to configure reception processing for a random access response expected from the network in reply to the random access request.

28. The device of claim 26, wherein the processing circuitry is configured to select and transmit, as the random access request, a random access preamble, according to mapping information that maps different random access preambles to different directional reception scanning abilities.

29. The device of claim 25, wherein, for receiving a network transmission, the processing circuitry is configured to configure reception beamforming at the device, in dependence on the directional reception scanning ability, wherein the directional reception scanning ability corresponds to whether the device has the ability to scan in multiple reception directions simultaneously, and, where the device is not able to scan in multiple reception directions simultaneously, the processing circuitry is configured to configure the reception beamforming at the device by configuring a set of reception beamforming directions to use for attempting to receive the network transmission.

30. The device of claim 25, wherein, for receiving a network transmission, the processing circuitry is configured to configure reception beamforming at the device, in dependence on the directional reception scanning ability, wherein the directional reception scanning ability corresponds to whether the device has the ability to scan in multiple reception directions simultaneously, and, where the device is not able to scan in multiple reception directions simultaneously, the processing circuitry is configured to configure the reception beamforming at the device by configuring at least one of a dwell time or a number of reception repetitions, to use in each of one or more reception beamforming directions used by the device for attempting to receive the network transmission.

\* \* \* \* \*